United States Patent [19]

Marrie

[11] 3,707,906
[45] Jan. 2, 1973

[54] TWO-PLATE GRIDDLE
[75] Inventor: Paul Marrie, Dijon, France
[73] Assignee: Societe a Responsabilite Limitee dite ETUD, Quetigny (Cote d'Or), France
[22] Filed: Oct. 15, 1970
[21] Appl. No.: 80,838

[52] U.S. Cl. ..................................99/372, 99/424
[51] Int. Cl. ..............................................A47j 37/06
[58] Field of Search..................99/372, 373–374, 99/375–376, 377–378, 379–380, 381–382, 419, 422–423, 424, 439, 441–442

[56] References Cited

UNITED STATES PATENTS

| | | | |
|---|---|---|---|
| 2,066,507 | 1/1937 | Yost | 99/376 |
| 2,597,541 | 5/1952 | Squires et al. | 99/377 |
| 2,607,287 | 8/1952 | Price | 99/380 X |
| 2,720,157 | 10/1955 | Harrison | 99/376 X |
| 3,007,595 | 11/1961 | Remley | 99/424 UX |
| 3,312,161 | 4/1967 | Nanna | 99/377 |
| 3,463,076 | 8/1969 | Keating | 99/422 |

Primary Examiner—Walter A. Scheel
Assistant Examiner—Arthur O. Henderson
Attorney—Karl F. Ross

[57] ABSTRACT

A cooking griddle has a pair of heat-storing plates with interfitting faces. The two plates are brought into engagement and one of them is heated directly so that the other is heated by conduction. Once a predetermined temperature is reached the heat is arrested and a piece of food, preferably meat, is clamped between the two faces and cooked with the heat stored in the two plates. An indicator is provided to show when the plates are sufficiently hot for cooking, and a thermostat can be provided to shut down the heat, if the unit is heated electrically, when a predetermined temperature is reached.

9 Claims, 13 Drawing Figures

Fig.1.

PAUL MARRIE
INVENTOR by Karl F. Ross
Attorney

PAUL MARRIE
INVENTOR by  Karl J. Ross

Attorney 3,707,906

TWO-PLATE GRIDDLE

FIELD OF THE INVENTION

The present invention relates to a griddle for cooking food, meat in particular.

BACKGROUND OF THE INVENTION

The handiest way to cook many foods is with a griddle, especially for such foods as cuts of meat, hamburgers, and the like. The griddle is simply a massive metallic plate which is heated and on which the piece of meat is placed. Due to the large heat loss of such a cooking surface, it must be kept very hot in order to cook the food completely.

Whether such a griddle is in the form of a pan which is set on the heat, or whether it has its own source of heat, several difficulties are present. First of all, the most common problem is that the food is charred on the surface and left largely raw inside. Then the food must be turned if it is to be cooked evenly, which requires constant surveillance. It is also necessary to pay careful attention that the food is not overcooked, since the high temperature of the griddle cooks very quickly. These disadvantages make cooking with such a griddle very difficult.

OBJECTS OF THE INVENTION

It is, therefore, an object of the present invention to provide an improved griddle and method of using same. Another object is to provide such a griddle which overcomes the above-given disadvantages.

SUMMARY OF THE INVENTION

The above objects are obtained according to the present invention by a griddle having a pair of heat-storing plates with interfitting faces. One plate is mounted on a support and the other is displaceable into and out of engagement with the support mounted plate. Means is provided for heating one of the plates when the other is in contact with it so that the other plate is heated conductively, and then the piece of food is cooked by the heat stored in the plates.

With such an apparatus and method the food is cooked from both sides simultaneously. At first the plates are very hot, around 290° C is preferred, so that the piece of food, usually meat, is seared, then as these plates cool off the meat is cooked through, if desired, and after a predetermined period of time the plates are too cool to cook any longer, so that no overcooking can take place. It is possible to merely place the food between the plates of such a griddle heated to a predetermined temperature, and leave it for enough time to cook, or much longer if necessary since it will only be cooked to a certain extent no matter what. No expert supervision is necessary; merely a dial, for example, need be set.

According to other features of the invention the lower plate is heated, either by placing it on a gas burner or by providing it with a resistive electric heating element, and the upper plate is displaceable. Both plates are corrugated and interfit when the griddle is closed for best heat transmission.

The upper, displaceable griddle plate, according to another feature of this invention, is mounted on a collar which fits around a bent upright and has a lock so that the upper plate can be fixed along the upright at any level. The bend in this upright allows the upper plate to extend parallel to the lower plate when the two are closely juxtaposed, but holds the upper plate at an angle out of the way when they are fully separated.

The plates are advantageously made of aluminum or one of its conductive heat-storing alloys or of some other heat-storing metal compatible with food.

DESCRIPTION OF THE DRAWING

The above and other objects, features, and advantages will become apparent from the following description, reference being made to the accompanying drawing, in which.

SPECIFIC DESCRIPTION

Figure 1:
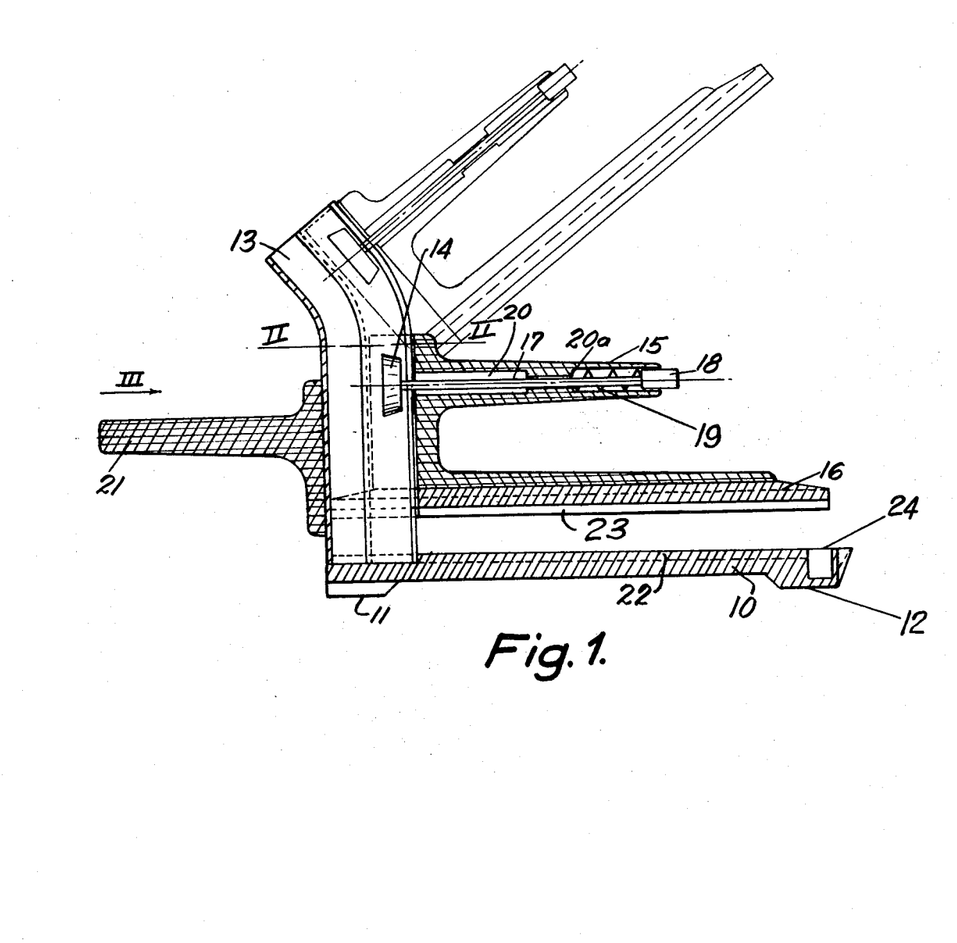
FIG. 1 is a vertical section through a first embodiment of the griddle according to the present invention.
Figure 2:
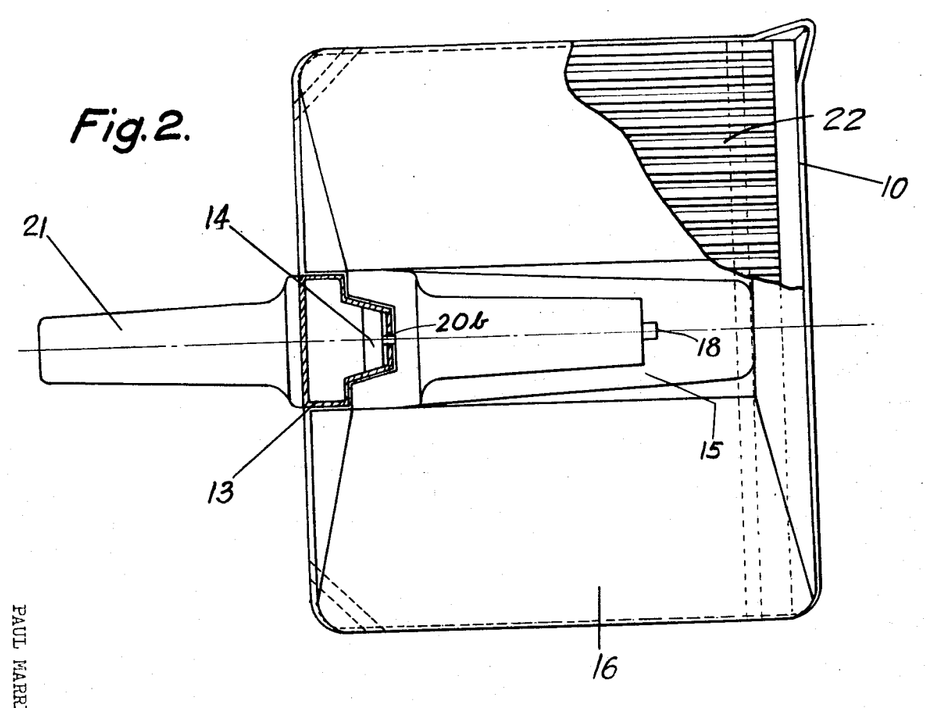
FIG. 2 is a section taken along line II — II of FIG. 1.
Figure 3:
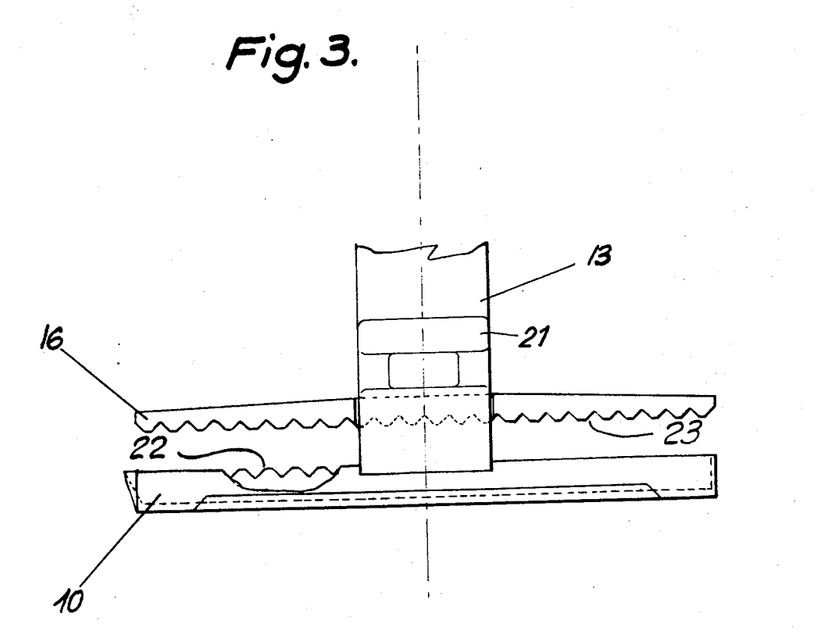
FIG. 3 is a view taken in the direction of arrow III of FIG. 1.

As shown in FIGS. 1 – 3, a griddle has a lower rectangular aluminum-alloy plate 10 which has feet 11 and 12 and is adapted to stand over a burner. A tubular support 13 having the cross section of a rectangle with one side formed into a trapezoid whose large base is in line with and shorter than the rectangle side is fixed to the plate 10 and carries a plate 16 which is itself fixed to a heat-resistant synthetic-resin handle 15 having a lock arrangement which holds it on the support 13.

This lock arrangement comprises a tapered disk 14 fixedly mounted on one end of a pin 17 passing through a bore 20 and carrying on its other end a button 18. A compression spring 19 braced between the button 18 and a shoulder 20a formed in the bore 20 wedges the disk 14 in the channel of the support 13 to clamp the upper plate 16 relative to the support 13. A slot 20b running the full length of the support 13 allows the upper plate 16 to move all the way along it, and even be removed therefrom. Furthermore, the support tube 13 is bent back at its upper portion so that, as shown in dot-dash lines in FIG. 1, when the upper plate 16 is clamped in its uppermost position, it extends at an angle to the lower plate 10 allowing free access to this lower plate 10.

The back side of the support 13 carries a synthetic-resin handle 21 serving for carrying of the griddle. In addition, the plates 10 and 16 are formed with complementary corrugations 22 and 23, respectively, which are adapted to interfit as shown in FIG. 3. The lower plate 10 is also formed with a peripheral gravy canal 24.

Figure 4:
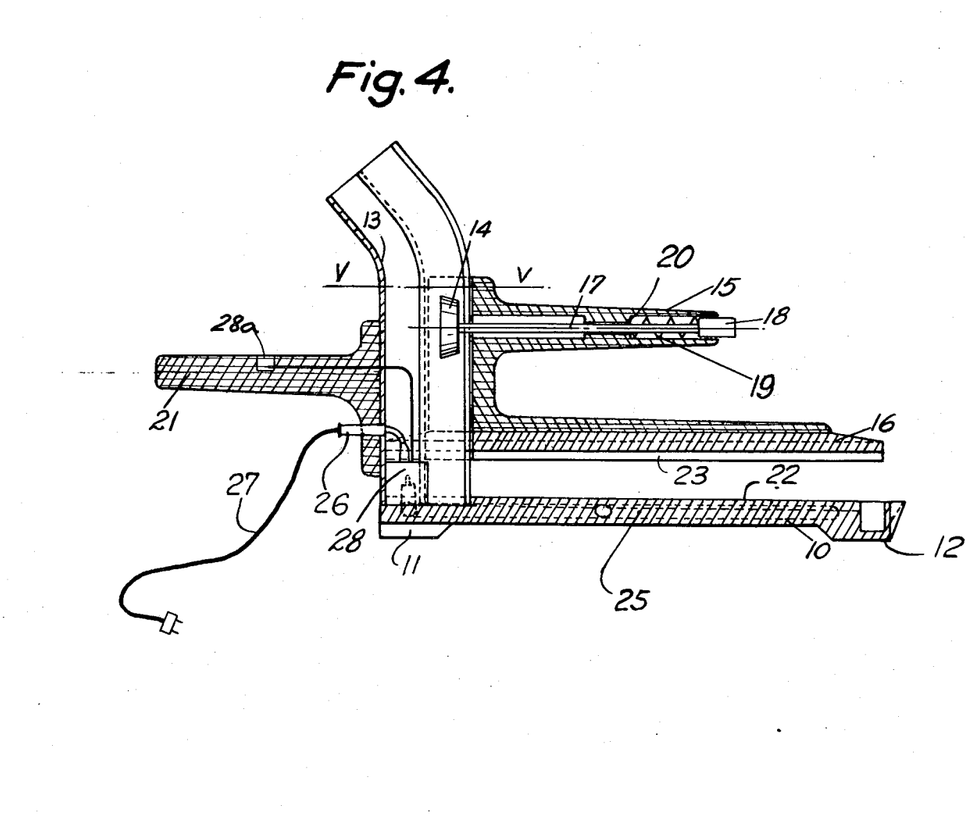
FIG. 4 is a view similar to FIG. 1 through a second embodiment of the griddle in accordance with the present invention.
Figure 5:
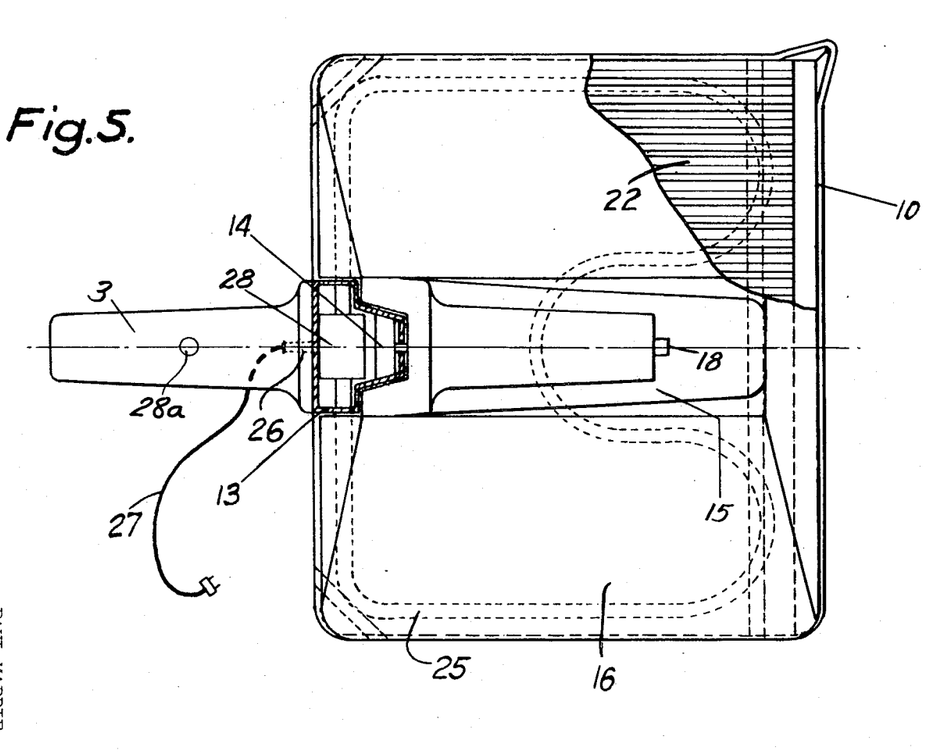
FIG. 5 is a section taken along line V — V of FIG. 4.

The griddle shown in FIGS. 4 and 5 is essentially identical to that of FIGS. 1–3, except that it is not adapted to be set over a burner to be heated. This griddle is provided with an electrical resistive heating element 25 connected through a thermostatic control 28 and a feed-through bushing 26 to a line cord 27. An indicator bulb 28a mounted on the handle 21 is connected in parallel to the element 25.

Both griddles shown in FIGS. 1 – 5 are used in the same manner: The plates 10 and 16 are first brought into mutual engagement and the lower plate 10 is heated. The upper plate 16 is heated conductively by heat transfer across the two interfitting corrugated faces. Once a predetermined temperature is reached, the heat is cut, the plates are separated, and a piece of meat is clamped between them. The temperature at which heating should be ceased is not more than 350° C so that when the piece of meat, i.e., sausage, a steak, bacon, a hamburger, is placed between the plates 10 and 16 it is nicely browned on both sides. As the temperature drops the meat cooks until around 150° C is reached, whereupon all cooking effectively stops, with the meat merely being held warm.

The bulb 28a shows when the element 25 is live in the embodiment of FIGS. 4 – 5, so that if a simple one-stage thermostat is provided the extinction of this lamp 28a will show when the predetermined temperature is attained. If desired, a two-stage thermostat can be provided wherein once the desired temperature is attained and the meat is clamped between the plates, a second temperature level of, say, 100° C for warming is held. This second stage action could be triggered by raising of the second plate 16 to place the meat under it.

It has been found to be advantageous that the plates 10 and 16 have a combined mass equal to not more than three times the mass of the food to be cooked. Thus, in one embodiment the plates weigh around 500 grams for a steak weighing 170 grams. Such a steak was cooked rare in around 30 seconds and well-done in 1 minute. Obviously, such a griddle is very light and easy to handle.

FIGS. 6 – 9 show another griddle according to the present invention. Its lower plate 110 is held by an inset support frame 111 formed of stainless-steel wire with V-shaped feet 112. Such a frame is elastic and at the same time very strong. A peripheral gravy channel 113 is provided as well as two handles 114 of square cross section and each formed with a laterally extending ear. Each handle 114 is made in two pieces held together by a screw 117, and fixed to the base plate 110 by two wires 115 fitted in holes 116 in this base plate 110.

Figure 6:
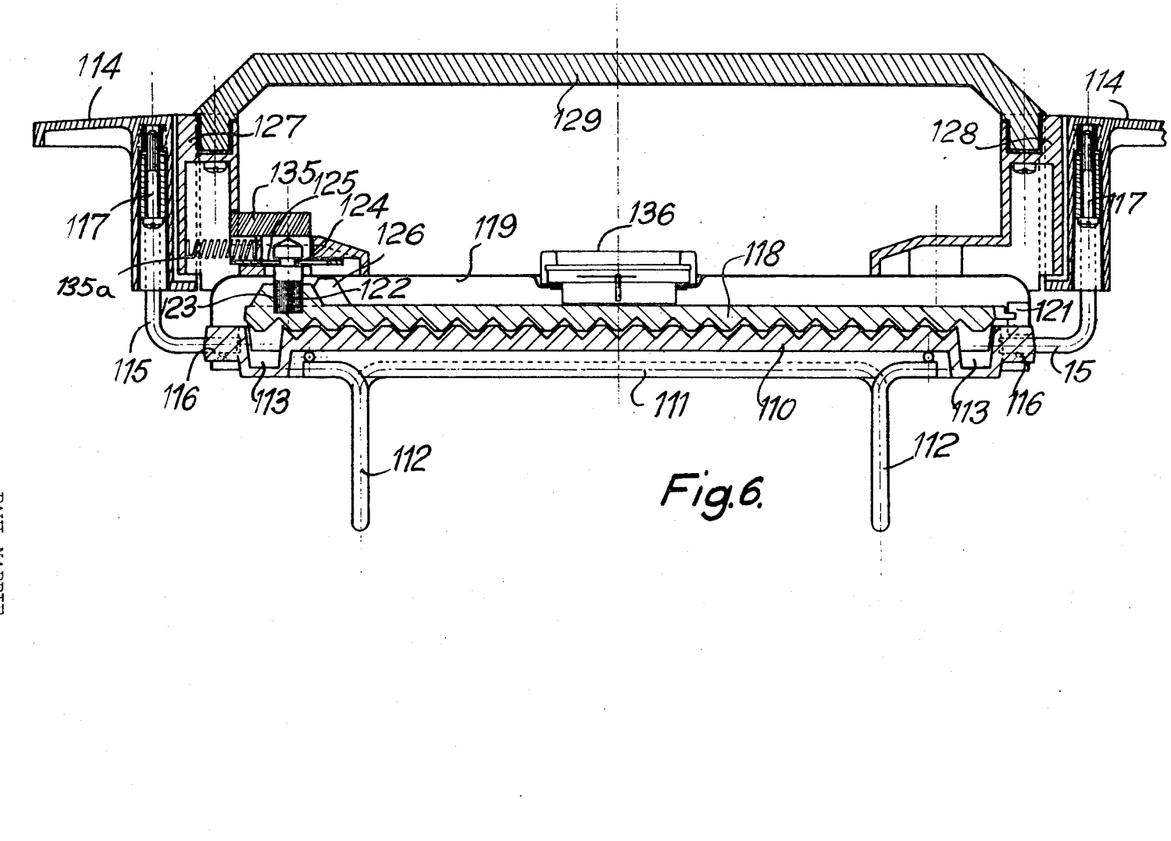
FIG. 6 is a vertical section through a third embodiment of this invention.
Figure 7:
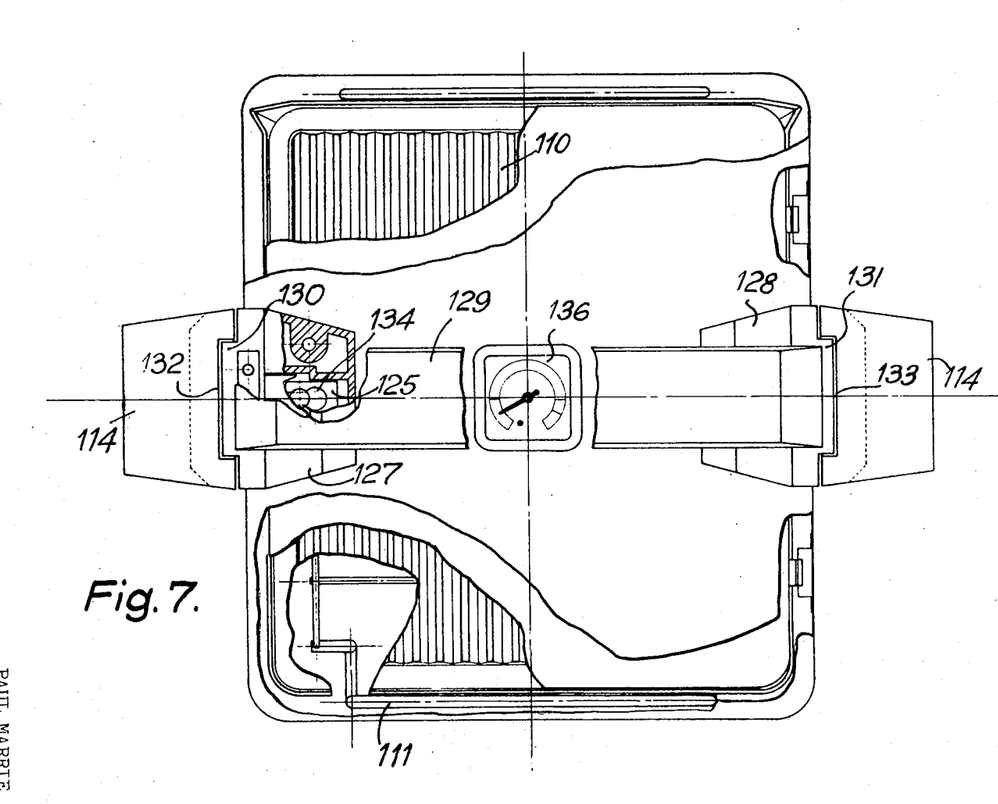
FIG. 7 is a top partly sectional view of the third embodiment.
Figure 8:
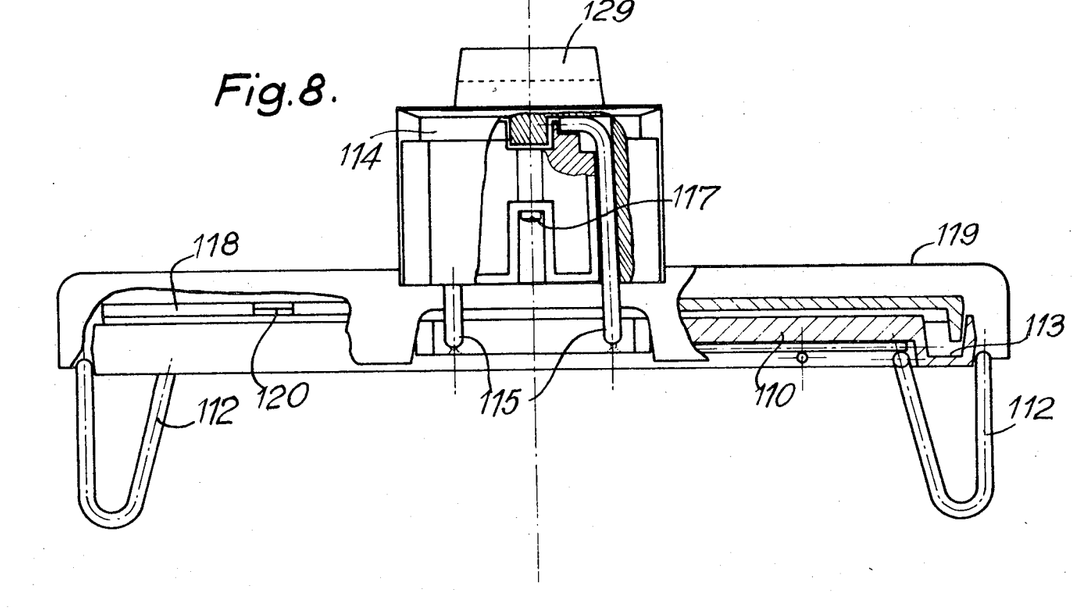
FIG. 8 is a side partly sectional view of the third embodiment.

The upper plate 118 is corrugated to fit against the lower plate 110 and is received in a stainless steel cover 119 which acts as a shield against too great heat loss. This plate 110 is formed with a pair of lugs 120 on one side which can engage in two corresponding recesses 121 on the cover 119. On the opposite side the plate 118 carries a locking pin 122 which is fixed in a bore 123 in the upper face of the plate, and which can engage through a hole in the cover 119 so that a locking bolt 125 can catch in a circumferential groove 124 formed in the upper portion of the pin 122. The plate 118 is further formed on the same side as the pin 122 with a pair of bosses engageable with the underside of the cover 119 to maintain a constant spacing between this cover 119 and the plate 118.

Attached to the sides of the cover 119 are a pair of thermosetting synthetic-resin mounts 127 and 128 which are spanned by and attached to a handle 129. Each mount 127, 128 is formed with a rectangular guide tenon 130, 131, engageable in a corresponding guide slot 132, 133, respectively, in the handles 114. These guides 130–133 are vertical so that the two plates 110 and 118 always register when the guides are interengaged, with only their spacing being variable.

The slide latch 125 is a metal plate formed with a keyhole opening 134. A button 135 is provided which is fixed to this plate 125 and is biased inwardly by a spring 135a braced between the button 135 and the respective handle 114. In this manner the groove 124 is engaged by the latch 125 to hold the plate 118 snugly in place in the cover 119. Pushing the button 135 to the left in FIG. 6 frees the pin 122 to allow the plate 118 to pivot counterclockwise on the lugs 120 so that once it clears the cover 119 it can be easily slipped out for cleaning. The reverse process is carried out for replacement of the plate 118: the lugs are engaged, the plate is pivoted clockwise, the button is depressed to clear the pin, and the button is released to latch the pin.

A temperature indicator 136 is provided on the cover 119 and is divided into three zones corresponding respectively to the temperature ranges below 100° C, 100° C to 300° C, and above 300° C.

A chart indicating temperatures and cooking times for different sizes of food can be provided, i.e. printed on the handle 129, to aid the user in the correct selection of temperature.

Figure 9:
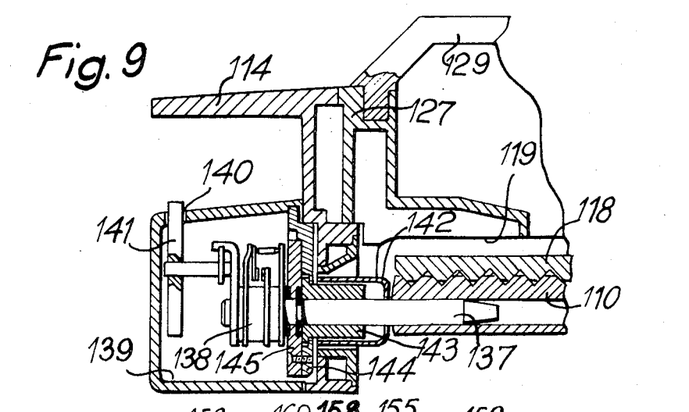
FIG. 9 is a sectional view of a detail of the third embodiment.

In order to be able to heat the above-described griddle electrically the thermostatic control shown in FIG. 9 is provided. A temperature-sensing probe 137 is snugly received in the plate 110 and connected to a thermostat 138 in turn received in a case 139. The thermostat 138 is of conventional structure, with its adjustment wheel 141 passing through a hole 140 in the top of the case 139 to allow setting of the cutoff temperature of the griddle. This thermostat 138 is a removable, plug-in unit having a shield 142 to protect it from grease and insulating block 143 for the probe as well as a support wall 144 against which the thermostat mounting plate 145 is screwed.

Figure 10:
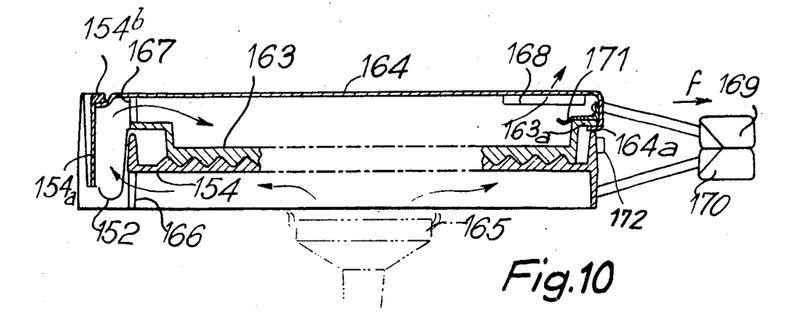
FIG. 10 is a vertical section through a fourth embodiment of the present invention.
Figure 11:
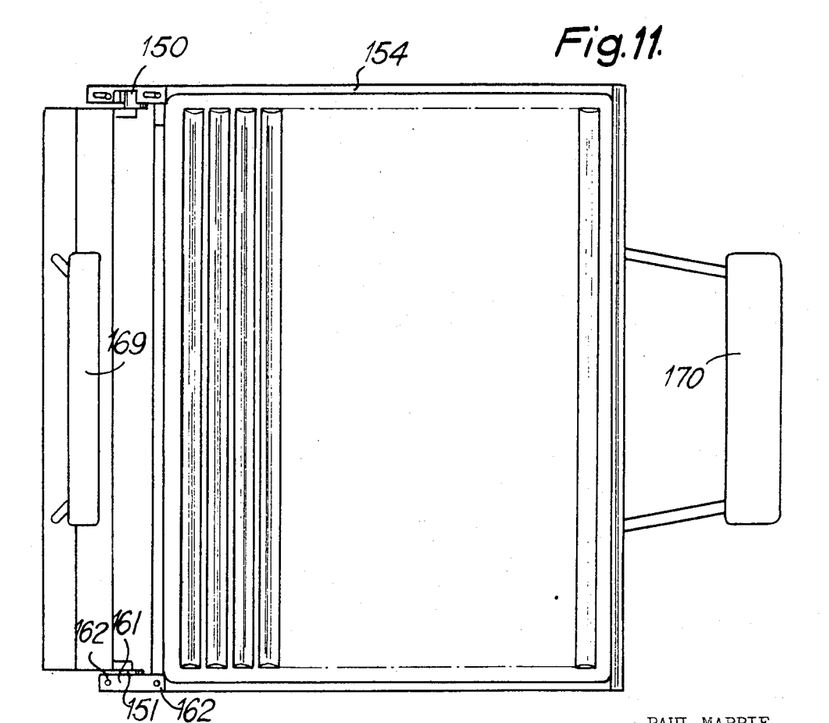
FIG. 11 is a top view of the fourth embodiment.

FIGS. 10 and 11 show another embodiment of the griddle according to the present invention having an upper plate 163 fixed with a predetermined spacing in a cover 164 so that the heat of a burner 165 is used in the most efficient manner possible. Two openings 166 and 167 are provided in the rear of the frame of the lower plate 154 and of the cover 164. Toward the front of the cover 164 there are provided two lateral rectangular openings 168, all of the openings being of substantially the same size.

Figure 12:
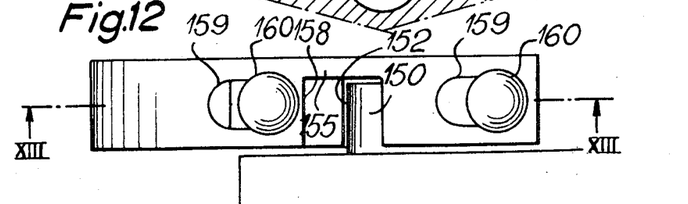
FIG. 12 is a detail of FIG. 11 in enlarged scale.
Figure 13:
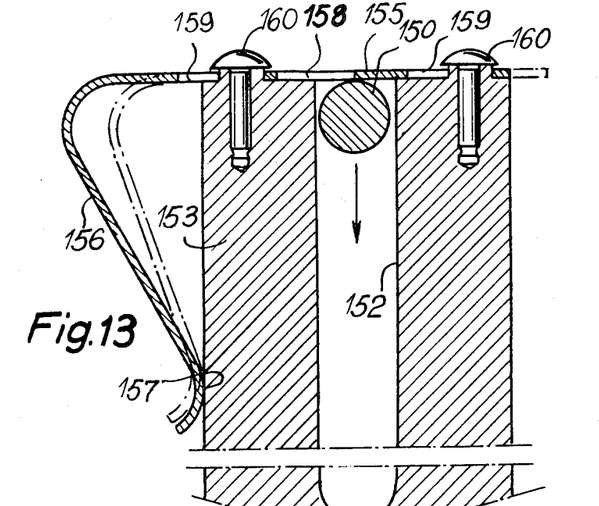
FIG. 13 is a section taken along line XIII — XIII of FIG. 12.

The plates 154 and 163 are hinged together by two arrangements centered on pins 150 and 151 shown in FIGS. 12 and 13. The pin 150 is received in a vertical groove 152 formed in a block 153 mounted on the side of the lower plate 154. A flat leaf spring 155 has a downwardly extending arm 156 engaging against the block 153 in a region 157 to urge the spring 155 to the left in FIGS. 12 and 13. The leaf spring 155 is formed with a notch 158 adapted to let the pin 150 escape from the groove 152 only when this spring 155 is pushed to the right. The spring 155 is also formed with two elongated holes 195 through which pass a pair of rivets 160 to hold it in place while allowing it to slide to a limited extent. The pin 151 can be provided with a similar arrangement, but preferably has its groove closed off by a small plate 161 held in place by rivets 162.

At the rear end of the plate 154 there is provided a grease shield 154a terminating at its upper edge in a lip 154b under which the extreme rear edge of the cover 164 engages. This cover 164 has a front edge 164a bent back to engage under a ledge 163a formed on the front edge of the plate 163. A spring 171 is provided to hold this ledge 163a against the lip 164a. A pull applied to a handle 169 attached to the cover 164 frees the plate 163 from this cover. This handle 169 is engageable with a handle 170 of the lower plate 154 in the closed position of the plates In such a griddle the heat from the burner 165 can flow through the openings 166 and 167 and then out through the openings 168 so that a current of hot air flows around the two plates 154 and 163 to heat them very rapidly.

FIG. 10 shows also a rivet 172 fixed in the front of the plate 154 which has a Teflon head that changes color at around 290° C to show when the griddle is heated up enough for cooking. Such a unit is heated until the rivet 172 changes color, then the piece of meat is clamped between the plates, and it is set to the side away from the heat while the meat cooks.

It is also possible to provide a plurality of upper plates, all having interfitting faces so that a veritable stack of, for example, steaks can be cooked at one time. Such an arrangement is especially of interest for a restaurant.

I claim:

1. A griddle for cooking a piece of meat, said griddle comprising:
a support;
a pair of complementary metallic plates, on said support having confronting faces, said support having a post;
means mounting one of said plates for movement on said post parallel to itself relative to the other of said plates to clamp a piece of meat between said faces; and
means for heating only one of said plates prior to insertion of said piece of meat and with said faces of said plates lying against each other in surface-contacting and heat-transmitting relationship, whereby stored heat in said plates serves to cook said piece of meat and the other plate is heated solely by said surface-contacting heat-transmitting relationship both of said plates being substantially horizontal with one above the other, the lower plate being adapted to be heated and being fixed on said support.

2. The griddle defined in claim 1 further comprising guide means permitting displacement of the upper plate down toward and up away from the lower plate while inhibiting displacement of the upper plate laterally relative to the lower plate for coupling said plates together.

3. The griddle defined in claim 2 wherein said plates are formed on their confronting faces with interfitting corrugations.

4. The griddle defined in claim 3 wherein said post is an upright element attached to said support, said guide means including a guide element displaceable along said upright element and attached to said upper plate.

5. The griddle defined in claim 4 wherein said guide means further comprises means for releasably locking said elements relative to each other.

6. The griddle defined in claim 5 wherein said upright element is tubular and said means for releasably locking said elements includes a hand-operable button actuatable to release said means for locking.

7. The griddle defined in claim 2 wherein said guide means includes a pair of elements fixed to opposite sides of said lower plate and formed with vertically extending guides, and a pair of guide members fixed to opposite sides of said upper plate and engageable in said guides.

8. The griddle defined in claim 7 wherein said guides are a pair of inwardly open channels and said guide members are a pair of outwardly directed substantially rectangular tenons.

9. The griddle defined in claim 2 wherein said guide means includes a pair of substantially coaxial outwardly directed pins mounted on said upper plate and a pair of vertically extending inwardly directed grooves mounted on said support and receiving said pins, and means for opening the upper extremity of one of said grooves for freeing the respective pin and allowing removal of said upper plate.

* * * * *

6984

UNITED STATES PATENT OFFICE
CERTIFICATE OF CORRECTION

Patent No. 3,707,906    Dated 31 January 1973

Inventor(s) Paul MARRIE

It is certified that error appears in the above-identified patent and that said Letters Patent are hereby corrected as shown below:

In the heading, after line /21/ before line /52/ insert:

-- /30/ FOREIGN APPLICATION PRIORITY DATA

16 October 1969    France    69-35427
21 July   1970     France    70-26812 -- .

Signed and sealed this 29th day of May 1973.

(SEAL)
Attest:

EDWARD M. FLETCHER, JR.          ROBERT GOTTSCHALK
Attesting Officer                Commissioner of Patents